United States Patent [19]

Kudrna

[11] Patent Number: 5,640,690
[45] Date of Patent: Jun. 17, 1997

[54] HINGE ASSEMBLY HAVING CAM FOLLOWER

[75] Inventor: Paul John Kudrna, Streamwood, Ill.

[73] Assignee: Motorola, Inc., Schaumburg, Ill.

[21] Appl. No.: 517,565

[22] Filed: Aug. 21, 1995

Related U.S. Application Data

[63] Continuation of Ser. No. 850,179, Mar. 11, 1992, abandoned.

[51] Int. Cl.⁶ .................................................. H04B 1/38
[52] U.S. Cl. .............................. 455/89; 455/90; 455/351; 16/321; 16/337
[58] Field of Search ............................. 455/89, 90, 128, 455/347, 348, 349, 351; 379/433; 16/337, 341, 342, 362, 374, 386, 321, 330

[56] References Cited

U.S. PATENT DOCUMENTS

| | | | |
|---|---|---|---|
| 4,227,283 | 10/1980 | Matthewson et al. | 16/128 R |
| 4,471,493 | 9/1984 | Schober | 455/89 X |
| 4,822,965 | 4/1989 | Hyogo et al. | 16/330 X |
| 4,897,873 | 1/1990 | Beutler et al. | 379/433 |
| 5,178,481 | 1/1993 | Kawamura | 16/337 X |
| 5,185,790 | 2/1993 | Mischneko | 16/321 X |
| 5,274,882 | 1/1994 | Persson | 16/257 X |

FOREIGN PATENT DOCUMENTS

| | | |
|---|---|---|
| 79 25076 | 5/1980 | France . |
| 1952 675 | 4/1970 | Germany . |
| 7710722 | 7/1977 | Germany . |
| 3709331 | 9/1988 | Germany . |

*Primary Examiner*—Edward P. Urban
*Attorney, Agent, or Firm*—Daniel W. Juffernbruch

[57] ABSTRACT

A hinge assembly for hingedly connecting a cover and a housing theretogether, such as a keypad cover and a housing of a portable radiotelephone. A generally tubular hinge arm is formed at an end portion of the cover, and two hinge pins, each having identical cam surfaces formed upon edge surfaces thereof are inserted into the hinge arm and positioned such that the cam surfaces of the respective hinge pins extend beyond opposing sides of the hinge arm such that the hinge pins are caused to rotate in unison with rotation of the cover. A spring member is tandemly-positioned between the two hinge pins to exert spring forces thereupon. Two cam followers are affixed to the housing in a manner such that the cam surfaces of the hinge pins abut against the cam followers. The cover may be rotated between an opened and a closed position and forces exerted upon the cam surfaces of the hinge pin by their abutting engagement with the cam followers urge the cover into or out of the open and closed positions during rotation of the cover, and urge the cover to remain in the open or the closed position in the absence of rotational moments exerted thereupon by the spring forces exerted upon the hinge pin by the spring member.

17 Claims, 5 Drawing Sheets

5,640,690

HINGE ASSEMBLY HAVING CAM FOLLOWER

This is a continuation of application Ser. No. 07/850,179, filed Mar. 11, 1992 and now abandoned.

BACKGROUND OF THE INVENTION

The present invention relates generally to hinge assemblies, and, more particularly, to a hinge assembly for hingedly connecting a cover to a housing.

Advancements in the field of radio electronics have permitted the introduction and commercialization of an ever-increasing array of radio communication apparatus. Advancements in electronic circuitry design have also permitted increased miniaturization of the electronic circuitry comprising such radio communication apparatus. As a result, an ever-increasing array of radio communication apparatus comprised of ever-smaller electronic circuitry has permitted such radio communication apparatus to be utilized more conveniently in an increased number of applications.

A radio transceiver, such as a radiotelephone utilized in a cellular, communication system, is one example of radio communication apparatus which has been miniaturized to be utilized conveniently in an increased number of applications. Additional efforts to miniaturize further the electronic circuitry of similar such radio transceivers, as well as other radio communication apparatus, are being made. Such further miniaturization of the radio transceivers will further increase the convenience of utilization of such apparatus, and will permit such apparatus to be utilized in further increased numbers of applications.

Pursuant to such efforts to miniaturize further the electronic circuitry of such radio transceivers (as well as other radio communication apparatus), size minimization of the electronic circuitry is a critical design goal during design of such circuitry.

Concomitant with the increased miniaturization of electronic circuitry is a corresponding reduction in the physical dimensions of the housings in which such electronic circuitry is housed as well as other mechanical structure associated therewith.

Initially, size reductions in the housing and associated mechanical structure was accomplished by simple, scale reduction of the dimensions of already-existing structures. However, beyond certain size reductions, such simple, scale reduction increasingly becomes impractical. Beyond a certain point, structural limitations of the materials comprising such structure cannot be reduced further without comprising the structural integrity thereof.

For instance, many radiotelephone constructions are of dimensions permitting their convenient hand-held carriage by a user and are commonly referred to as portable telephones. Such radiotelephone constructions typically include a telephonic keypad disposed upon a face surface thereof to permit the initiation of telephonic communication by depressing a desired sequence of keys of the keypad. The particular sequence of keys to be depressed is determined by the telephone number desired to be dialed. The keypad also frequently includes other keys utilized for other purposes including, for example, an actuation key for turning-on or turning-off the radiotelephone.

To prevent unintentional actuation of any of the keys of the radiotelephone, several portable radiotelephone constructions include a cover which may be positioned to cover the keypad when the radiotelephone is not in use. Such radiotelephone constructions connect the cover to the radiotelephone housing in a hinged connection allowing rotation about such hinged connection to position the cover overtop the keypad of the radiotelephone, or, alternately, to uncover the keypad to permit access thereto by a user. When the radiotelephone construction is relatively large, a hinge assembly forming such hinged connection may be easily implemented.

However, with the ongoing efforts to reduce the physical dimensions of the housing and other related mechanical structure of the radiotelephone, there is a need for a hinge assembly of minimum physical dimensions which permits hinged connection of the keypad cover to the housing.

Such a hinge assembly of minimum physical dimensions must also be of simple construction to permit ease of assembly. Preferably, such hinge assembly construction would further be of a design permitting assembly thereof in an assembly line-like process by robotic or other automated apparatus.

What is needed, therefore, is a hinge assembly of minimal physical dimensions which may be easily assembled to facilitate assemblage thereof by automated apparatus.

SUMMARY OF THE INVENTION

The present invention, accordingly, advantageously provides a hinge assembly of reduced physical dimensions.

The present invention further advantageously provides a hinge assembly which facilitates assembly thereof by automated process.

The present invention further advantageously provides a radiotelephone construction having a keypad cover connected to a radiotelephone housing by a hinged connection formed by a hinge assembly of minimal physical dimensions.

The present invention provides further advantages and features, the details of which will become more apparent by the reading the detailed description of the preferred embodiments hereinbelow.

In accordance with the present invention, therefore, a hinge assembly for hingedly connecting a first substrate and a second substrate theretogether is disclosed. The hinge assembly permits positioning of the first substrate in a closed position whereat a face surface of the first substrate and a face surface of the second substrate abut against one another, and in at least one open position whereat the first substrate extends beyond the second substrate at an angled orientation relative thereto. The hinge assembly comprises a hinge arm coupled to at least the first substrate, wherein the hinge arm forms a transversely-extending, hinge receiving chamber defined by inner sidewalls of the hinge arm. At least one axially-extending hinge pin has a cam surface formed on an edge surface thereof, with the cam surface defining at least two valley portions separated by a peak portion. The at least one axially-extending hinge pin is of dimensions permitting insertion thereof through the hinge receiving chamber such that, when inserted therein, rotational moments exerted upon the first substrate to cause rotational movement of the first substrate, cause corresponding rotational movement of the hinge pin. At least one cam follower is affixed to the second substrate and extends therebeyond. The cam follower engages with the cam surface formed upon the edge surface of the at least one axially-extending hinge pin such that exertion of rotational moments upon the first substrate causes rotation of the first substrate in a first direction to position the first substrate in the closed position, and causes positioning of a first of the two valley portions of the cam surface of the hinge pin in abutting engagement with the cam follower. Exertion of rotational moments upon the first substrate in an opposing direction positions the first substrate in the open position and causes positioning of a second of the two valley portions of the cam surface of the hinge pin in an abutting engagement with the cam follower to maintain the first substrate in the open position thereby.

BRIEF DESCRIPTION OF THE DRAWINGS

The present invention will be better understood when read in light of the accompanying drawings in which.

DESCRIPTION OF THE PREFERRED EMBODIMENTS

Figure 1:
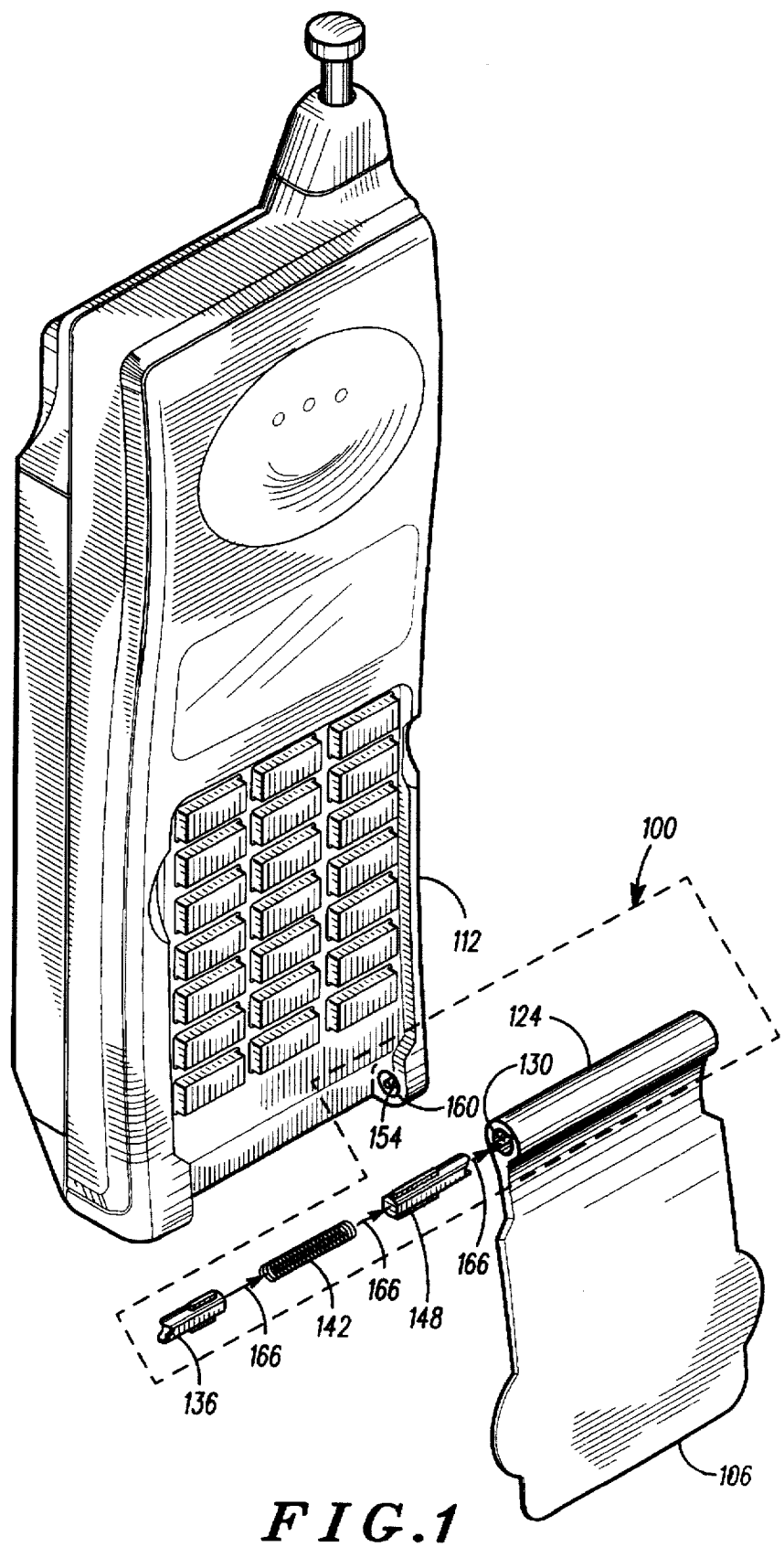
FIG. 1 is an exploded, perspective view of the hinge assembly of a preferred embodiment of the present invention, here constructed to form a hinged connection for hingedly connecting a cover to a housing.

Referring first to the exploded, perspective view of FIG. 1, a block, shown in hatch, identifies the elements which together form the hinge assembly, referred to generally by reference numeral 100, of the preferred embodiment of the present invention. In the exemplary embodiment of FIG. 1, hinge assembly 100 is operative to form a hinged connection between cover 106 and housing 112. It is to be noted at the outset, however, that hinge assembly 100 may alternately be adapted to form a hinged connection between any of many other substrates.

As indicated by the block, shown in hatch in the figure, hinge assembly 100 comprises hinge arm 124 which defines a transversely-extending hinge receiving chamber 130, and which is formed integral with cover 106. Hinge assembly 100 further comprises first hinge pin 136, spring member 142, second hinge pin 148, and cam follower 154. Cam follower 154 is affixed to housing 112. In the preferred embodiment, hinge assembly 100 further comprises supportive bushings 160 molded within sidewalls of housing 112. (Only one supportive bushing 160 is shown in FIG. 1; a second supportive bushing 160 is hidden from view in the figure, but is similarly formed in a sidewall opposing the sidewall in which the illustrated, supportive bushing 160 is shown.) As illustrated cam follower 154 extends into the support area defined by bushing 160. (A second cam follower similarly extends into a support area defined by the bushing 160 hidden from view in the figure.)

Hinge receiving chamber 130 defined by inner sidewalls of hinge arm 124 is of dimensions permitting insertion of hinge pins 136 and 148 and spring member 142 therein. Hinge pins 136 and 148 and spring member 142 are properly supported by hinge arm 130 such that end portions of hinge pins 136 and 148 extend beyond opposing sides of the hinge arm by inserting, sequentially and in the directions noted by arrows 166, hinge pin 136, spring member 142, and hinge pin 146 into hinge arm 130. Hinge pins 136 and 148 and spring member 142 are of collective axial dimensions relative to that of the axial length of hinge arm 124 such that end surfaces of hinge pins 136 and 148 extend beyond opposing sides of hinge arm 124 when spring member 142 is uncompressed, but wherein compression of spring member 142 permits the collective lengths of pins 136 and 148 and spring member 142 to be less than the axial length of hinge arm 124.

Once hinge pins 136 and 148 and spring member 142 are suitably inserted within hinge arm 124, hinge pins 136 and 148 together define a pivot axis about which cover 106 may be rotated either to position the cover 106 in a closed position whereat a face surface of cover 106 abuts upon a face surface of housing 112, or alternately, to position cover 106 such that the cover extends at an angle relative to housing 112.

Figure 2:
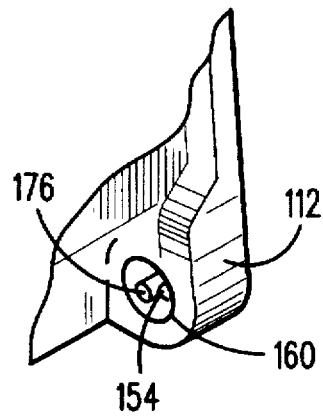
FIG. 2 is an enlarged, cut-away view of a portion of a sidewall of the housing of FIG. 1 showing the positioning of a cam follower which forms a portion of the hinge assembly of the preferred embodiment of the present invention.

Turning now to the enlarged, cut-away view of FIG. 2, one of the supportive bushings 160 formed in a sidewall of housing 112 is shown in greater detail. In the preferred embodiment, bushings 160 are formed in opposing sidewalls of housing 112 to provide support to portions of hinge pins 136 and 148 which extend beyond opposing sides of hinge receiving chamber 130 of hinge arm 124. As noted previously, cam follower 154 is affixed to housing 112, and extends into a support area defined by bushing 160. Axle 176 is centered about a central axis of bushing 160 and is operative to provide further support to cam follower 154. It is noted that when hinge pin 136 or 148 is supported by housing 160, cam follower 154 limits translation of the hinge pin in the direction of the longitudinal axis thereof, and bushing 160 provides support to the hinge pin by way of outer circumferential portions of the hinge pin and by way of axle 176.

Figure 3A:
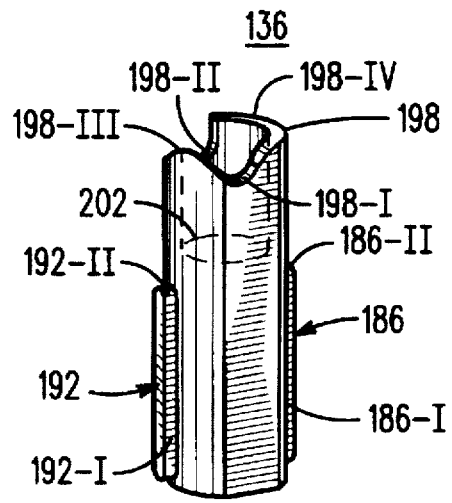
FIG. 3A is an enlarged view, in isolation, of one of the hinge pins of the preferred embodiment of the present invention.

Turning next to the enlarged view of FIG. 3A, hinge pin 136 is shown in isolation. Hinge pin 136 is formed of a generally cylindrical body, elongated about a longitudinal axis thereof. In a preferred embodiment, hinge pin 136 is formed of a thermoplastic material; other materials of construction may, of course, be alternately utilized.

The diametrical dimensions of hinge pin 136 are selected to permit insertion of the hinge pin within the hinge receiving chamber 130 of hinge arm 124 shown in FIG. 1. Formed to extend longitudinally along portions of the length of hinge pin 136 about circumferential portions thereof are key members 186 and 192. Face surfaces of key members 186 and 192—face surfaces 186-I, 186-II, 192-I, and 192-II are shown in the figure—form force receiving surfaces operative in manners to be discussed more fully hereinbelow. Key members 186 and 192 are preferably, but not by necessity, formed at opposing sides of hinge pin 136.

Axial cam surface 198 is formed upon an edge surface of an end portion of hinge pin 136. Cam surface 198 defines valleys 198-I and 198-II separating by peaks 198-III and 198-IV. Bore 202 is formed to extend into the body of hinge pin 136 from the end portion thereof. Bore 202 forms an axle-receiving surface and is of dimensions permitting extension therein of axle 176 of bushing 160 when hinge pin 136 is positioned to be supported by the bushing.

Figure 3B:
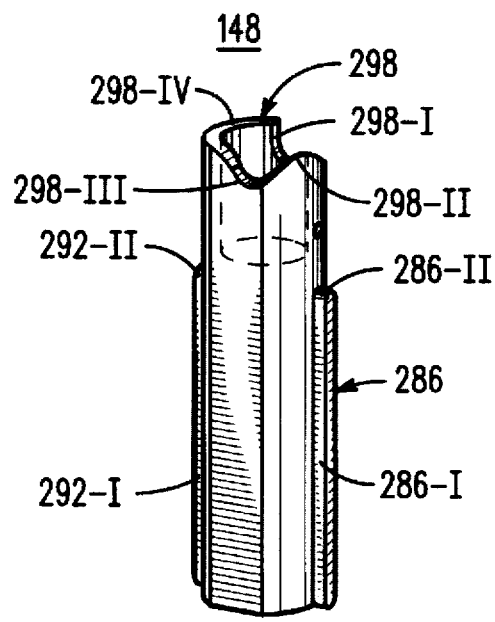
FIG. 3B is an enlarged view, in isolation, of a second of the hinge pins of the preferred embodiment of the present invention.

FIG. 3B is an enlarged view of hinge pin 148, shown in isolation. Hinge pin 148 is substantially similar with hinge pin 136 and is formed of a cylindrical body elongated along a longitudinal axis thereof. (It is noted, however, that, for manufacturing reasons, the hinge pins may alternately be of dissimilar lengths, if so desired.) Hinge pin 148 is also preferably comprised of a thermoplastic material; other materials of construction may, of course, be alternately utilized. Key members 286 and 292 are formed to extend longitudinally along at least portions of the lengths of circumferential portions of hinge pin 148. Face surfaces of key members 286 and 292 form force receiving surfaces similar to surfaces 186-I, 186-II, 192-I, and 192-II of hinge pin 136 of FIG. 3A. Force receiving surfaces 286-I, 286-II, and 292-I and 292-II are indicated in FIG. 3B.

Formed on an edge surface of hinge pin 148 is cam surface 298. Cam surface 298 defines valleys 298-I and 298-II separated by peaks 298-III and 298-IV. Cam surface 298 is similar in contour with, and is a mirror image of, cam surface 198 of hinge pin 136.

Figure 4:
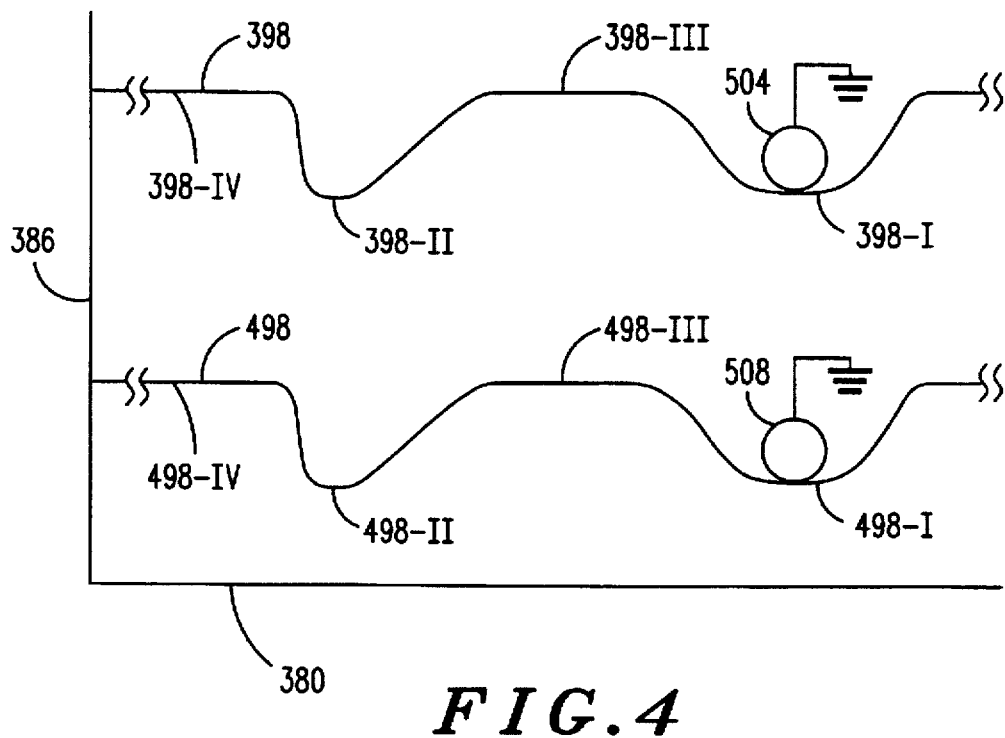
FIG. 4 is a graphical representation of cam displacement curves showing the relationship between the cam surfaces of the hinge pins of a first preferred embodiment of the present invention.

Turning now to the graphical representation of FIG. 4, cam displacement curves are shown to illustrate the relationship between the cam surfaces formed upon edge surfaces of hinge pins 136 and 148 according to a first, preferred embodiment of the present invention. Both abscissa axis 380 and ordinate axis 386 are scaled in terms of length dimensions, and curves 398 and 498 are two-dimensional plots of the cam surfaces formed upon edge surfaces of hinge pins 136 and 148, respectively. Trough portions of curve 398 represent valleys, here indicated by reference numerals 398-I and 398-II. Troughs 398-I and 398-II correspond to valleys 198-I and 198-II of hinge pin 136 of FIG. 3A.

Similarly, peaks 398-III and 398-IV corresponds to peaks 198-III and 198-IV of hinge pin 136.

Trough portions of curve 498 similarly represent valleys, here indicated by reference numerals 498-I and 498-II. Troughs 498-I and 498-II correspond to valleys 298-I and 298-II of hinge pin 148 of FIG. 3B. Also, peaks 498-III and 498-IV correspond to peaks 298-III and 298-IV of hinge pin 148.

Comparison of curve 398 and curve 498 indicates that the cam surfaces 198 and 298 of which curves 398 and 498 are representative, are identical.

In a first, preferred embodiment of the present invention, hinge pins 136 and 148 are inserted into hinge receiving chamber 130, and are oriented in a similar, phase orientation. That is to say, hinge pins 136 and 148 are oriented such that, when positioned to abut against respective cam followers 154, similar portions of the cam surfaces 198 and 298 abut against the respective cam followers 154. Such similar orientations of hinge pins 136 and 148 are represented by positioning of cam followers, indicated by circles 504 and 508 in the graphical representation of FIG. 4, located in similar portions of valleys 398-I and 498-I, respectively.

Figure 5:
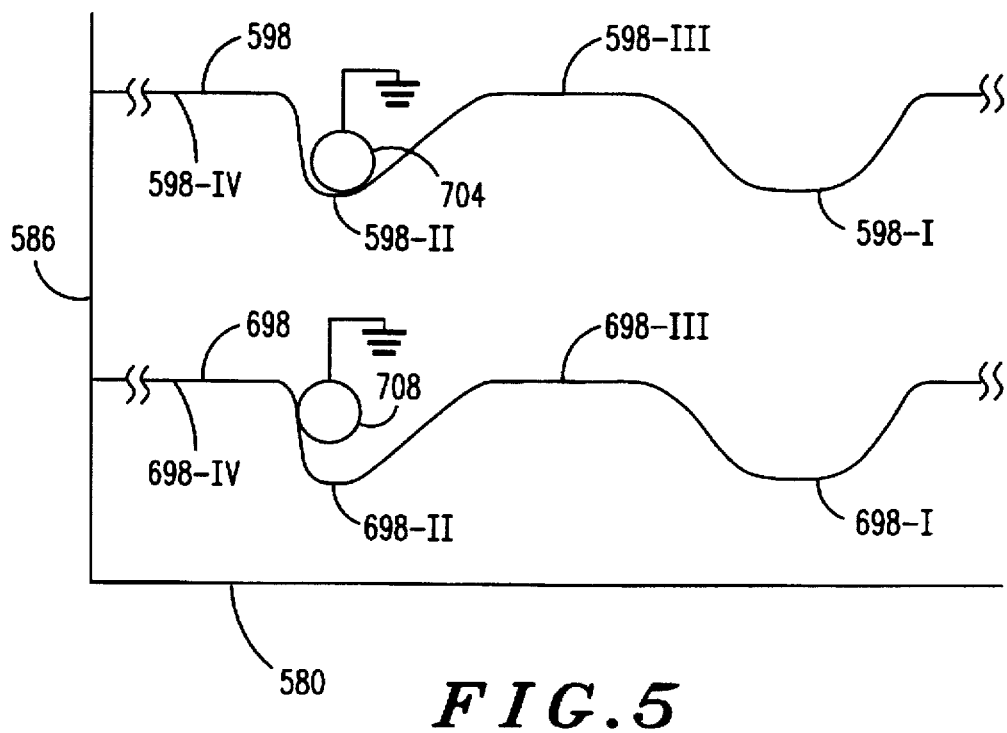
FIG. 5 is a graphical representation, similar with that of FIG. 4, but illustrating the relationship between the cam surfaces of the hinge pins of an alternate, preferred embodiment of the present invention.

Turning next to the graphical representation of FIG. 5, cam displacement curves are shown which are similar to the cam displacement curves of FIG. 4, but which are illustrative of the relationship between cam surfaces formed upon edge surfaces of hinge pins 136 and 148 of an alternate, preferred embodiment of the present invention. Both abscissa axis 580 and ordinate axis 586 are scaled in terms of length dimensions, and, analogous to curves 398 and 498 of FIG. 4, curves 598 and 698 are two-dimensional plots of the cam surfaces formed upon edge surfaces of hinge pins 136 and 148, respectively. Again trough portions of curve 598 represent valleys, here indicated by reference numerals 598-I and 598-II. Troughs 598-I and 598-II correspond to valleys 198-I and 198-II of hinge pin 136 of FIG. 3A. Peaks of cam surface 198 are similarly represented upon curve 598 by peaks 598-III and 598-IV.

Also, trough portions of curve 698 represent valleys, here indicated by reference numerals 698-I and 698-II. Troughs 598-I and 598-II correspond with valleys 298-I and 298-II of hinge pin 148. And, peaks 698-III and 698-IV correspond with peaks 298-III and 298-IV of hinge pin 148.

The graphical representation of FIG. 5, in contrast with the orientation of hinge pins 136 and 148 of FIG. 4, illustrates and arrangement in which hinge pins 136 and 148 are in a relative, out-of-phase relation therebetween. That is to say, when hinge pins 136 and 148 are inserted into hinge receiving chamber 130 of hinge arm 124, the hinge pins are positioned in a phase relationship such that abutting engagement of cam surfaces 198 and 298 of hinge pins 136 and 148, respectively, with cam followers affixed to housing 112, such that dissimilar portions of the respective cam surfaces abut against corresponding ones of the cam followers.

The cam followers are represented in the graphical representation of FIG. 5 by circles 704 and 708 which are positioned at dissimilar locations of curves 598 and 698. Cam follower 704 is positioned at the bottom of valley 598-I while cam follower 708 is positioned upon a slope extending toward a bottom of valley 698-II. Such a relative phase relation between the cam surfaces formed upon the respective ones of the hinge pins causes opposing forces to be exerted upon the respective hinge pins, and, hence, as will be noted more fully hereinbelow, to exert opposing forces upon cover 106.

Figure 6:
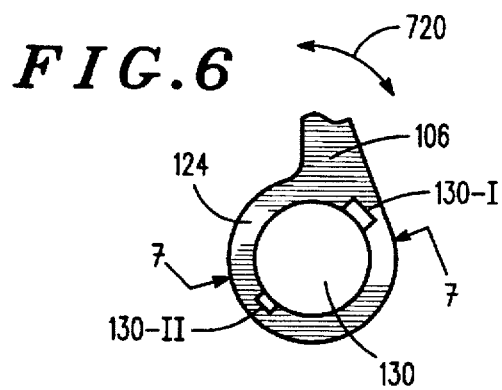
FIG. 6 is a cut-away, end view, in elevation, of the hinge arm of the hinge assembly of the preferred embodiment of the present invention.

Turning next to the cut-away, end view of FIG. 6, a view of hinge arm 124 taken beyond an end thereof is shown. Hinge arm 124 is integrally formed to extend beyond an end surface of cover 106, and is generally tubular in configuration. Inner sidewalls of hinge arm 124 define hinge receiving chamber 130 which is also generally tubular in configuration. Hinge receiving chamber 130, defined to extend through hinge arm 124 form openings at opposing sides of the hinge arm; one of such openings is shown in the end view of FIG. 6.

The end view of FIG. 6 further illustrates key slots 130-I and 130-II formed to extend longitudinally along the sidewalls which define hinge receiving chamber 130. Key slots 130-I and 130-II correspond in number and orientation with key members 186 and 192 of hinge pin 136 and also with key members 286 and 292 of hinge pin 148. Such key slots thereby permit insertion of the hinge pins into hinge receiving chamber 130.

Once hinge pins 136 and 148 are inserted into hinge receiving chamber 130, mated engagement of the key members formed upon the hinge pins prevents rotation of the hinge pins relative to hinge arm 124. Because rotation of hinge pins 136 and 148 relative to rotation of hinge arm 124 is prevented, rotation of hinge pins 136 and 148 occurs only responsive to rotation of the hinge arm 124. And, as hinge arm 124 is integrally formed with cover 106, rotation of hinge arms 136 and 148, once inserted into hinge receiving chamber 130, occurs only responsive to corresponding rotation of the cover.

Rotating moments exerted upon cover 106, in either the clockwise or the counterclockwise direction, as indicated by arrow 720 of FIG. 6, to cause rotation of cover 106, are transmitted to the hinge pins by way of the force receiving surfaces formed upon longitudinally-extending, face surfaces of key members 186, 192, 286, and 292. The hinge pins are thereby caused to rotate in unison with corresponding rotation of hinge arm 124 and cover 106. Because key members 186, 192, 286, and 292 extend longitudinally along substantial portions of the lengths of the respective hinge pins 136 and 148, forces transmitted to the key members are transmitted along substantial portions of the lengths of the hinge pins.

Figure 7:
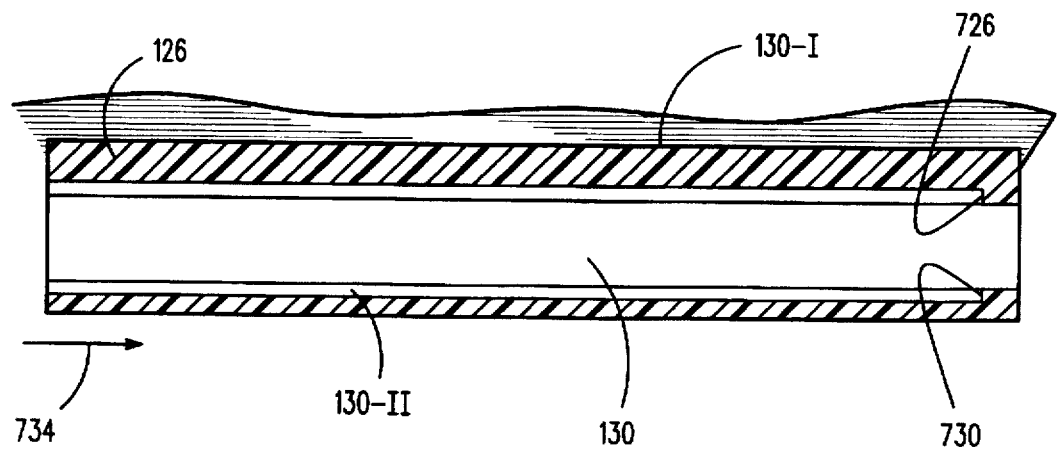
FIG. 7 is a lateral, sectional view of the hinge arm taken along line 7—7 of FIG. 6.

FIG. 7 is a lateral, sectional view of hinge arm 124 taken along lines 7—7 of FIG. 6. Hinge receiving chamber 130 is again shown to be generally tubular in configuration and to extend through hinge arm 124. Key slots 130-I and 130-II are also shown in the figure. The key slots, however, do not extend entirely along the entire longitudinal length of the hinge receiving chamber 130, but, rather, are formed to extend along only a portion of the length of the chamber. The ends of the key slots are defined by transverse sidewall portions 726 and 730 of the inner sidewalls of hinge arm 124 which define hinge receiving chamber 130.

As a result, translation of hinge pin 136, once inserted into the hinge receiving chamber, is permitted only until force receiving surfaces 186-II and 192-II abut against sidewall portions of hinge arm 124 to seat thereagainst.

By appropriate selection of the lengths of key slots 130-I and 130-II, translation of hinge 136 may be permitted to cause cam surface 198 of hinge pin 136 to extend beyond an end of hinge arm 124.

Once the force receiving surfaces 186II and 192II of the hinge pin are suitably seated against the transverse sidewall portions 726 and 730 of hinge arm 124 such that the cam surface of the hinge pin extends beyond an end of the hinge arm, spring member 142 (shown in the exploded view of FIG. 1) may be inserted into hinge receiving chamber 130, and then the remaining hinge pin, i.e., hinge pin 148, may be inserted into hinge receiving chamber 130.

Figure 8:
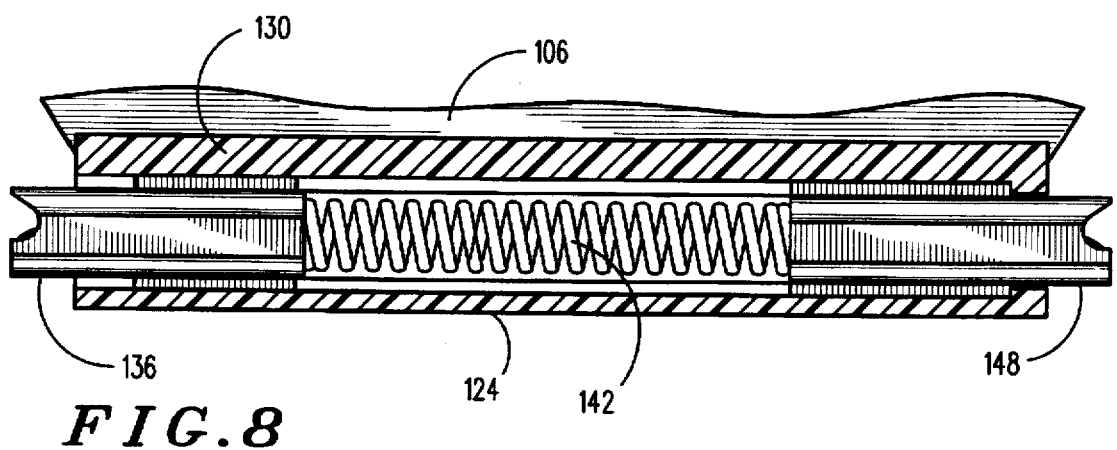
FIG. 8 is a lateral, sectional view, similar with that of FIG. 7, but further illustrating positioning of the hinge pins and spring members of the preferred embodiment of the present invention within the hinge receiving chamber.

FIG. 8 is a lateral, sectional view, similar with that of FIG. 7, but illustrating the arrangement of hinge pins 136 and 148 and spring member 142 once inserted into hinge receiving chamber 130 and translated into position therewithin. The collective lengths of hinge pins 136 and 148 and spring member 142, when spring member 142 is in an uncompressed state, is greater that the longitudinal length of hinge receiving chamber 130 such that cam surfaces 198 and 298 of hinge pins 136 and 148 extend beyond opposing ends of hinge arm 124. However, by applying compressive forces to the spring member 142 by way of translation of forces applied upon hinge pins 136 and 148 in directions indicated by arrows 731 and 733, the collective lengths of hinge pins 136 and 148 and spring member 142 is reduced to be the same as, or less than, the length of hinge arm 124. Exertion of such forces permits positioning of hinge arm 124 at bushings 160 whereat, upon termination of application of the translation forces upon hinge pins 136 and 148 permits seating of the hinge pins upon corresponding ones of the bushings 160.

It is further noted that hinge pin 136, hinge pin 148, and spring member 142 are positioned within hinge receiving chamber 130 of hinge arm 124 by translation of the respective elements in the direction indicated by arrow 734. Because such elements are positioned within hinge receiving chamber 130 by translation in a single direction, assembly of such elements into hinge arm 124 is amenable to an automated process.

While hinge receiving chamber 130 is generally tubular in configuration, when hinge arm 124 is comprised of a thermoplastic material formed in a molding process, the sidewalls which define hinge receiving chamber 130 are slightly tapered for manufacturing reasons. Accordingly, a cross section of hinge receiving chamber 130 taken at different locations along the hinge receiving chamber are of slightly different diameters.

Figure 9:
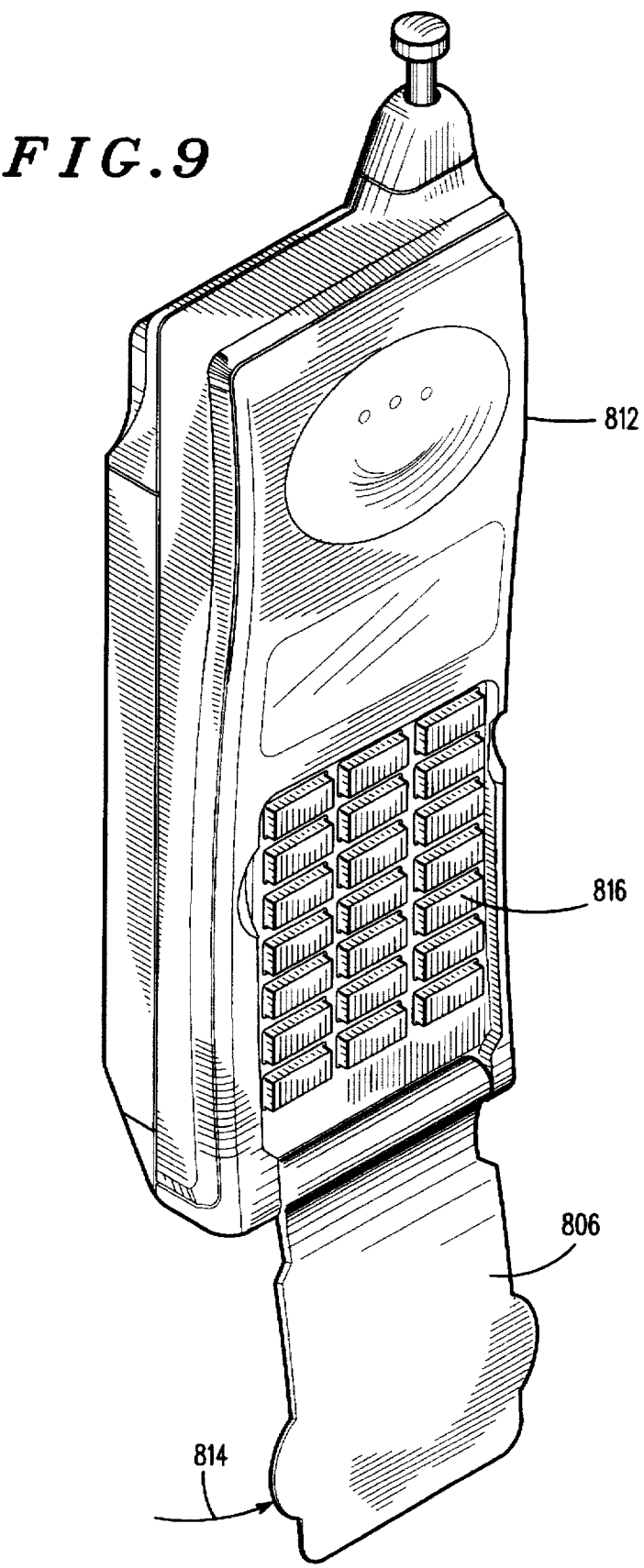
FIG. 9 is a perspective view of a radiotelephone of a preferred embodiment of the present invention in which the hinge assembly of the preceding figures forms a portion.

FIG. 9 is a perspective view of a portable radiotelephone, referred to generally by reference numeral 800, of the present invention. Radiotelephone 800 includes keypad cover 806 which is hingedly connected to radiotelephone housing 812 by way of hinge assembly 100, and the elements incorporating such, shown in the preceding figures. While keypad cover 806 is illustrated in an open position, exertion of a rotating moment upon the cover in a direction indicated by arrow 814 causes pivotal movement of cover 806 about the hinge to position the cover in a closed position whereat the keypad cover 806 covers keypad 816. Conversely, when cover 806 is positioned in the closed position, a rotating moment applied to the cover in a direction opposite to that of arrow 814 causes pivotal movement of the keypad cover to position the cover in the illustrated, open position.

With reference again to the cam displacement curve of FIG. 4, the function of cam surfaces 198 and 298 formed upon the edge surfaces of hinge pins 136 and 148, respectively, as represented by curves 398 and 498 in relation to operation of radiotelephone 800 will be described.

Circles 504 and 508 representative of cam pins 154 indicate the relationship between the cam pins of hinge assembly connecting cover 806 and housing 812 theretogether when keypad cover 806 is in the open position illustrated in FIG. 9. Application of the rotating moment to keypad cover 806 in the direction indicated by arrow 814 to cause pivotal movement of keypad cover 806 causes corresponding rotation of hinge pins 136 and 148 upon which the cam surfaces are formed. Such rotation of the hinge pins cause the cam pins (again, represented by circles 504 and 508 in FIG. 4) to abut against other portions of the respective cam surfaces 198 and 298. More particularly, during rotation of the keypad cover 806 (and, hence, hinge pins 198 and 298), out of the open position and into the closed position, the respective cam pins are positioned in abutting engagement with sloped surfaces leading out of valleys 398-I and 498-I which extend towards peak portions 398-III and 498-III. Continued rotation of keypad cover 806 causes positioning of the respective cam pins upon the slope leading from peak portions 398-III and 498-III to valleys 398-II and 498-II. When keypad cover 806 is rotated into the closed position, hinge pins 136 and 148 are rotated such that valley portions 398-II and 498-II abut against the cam pins.

When the keypad cover 806 is rotated to be in either the open position or the closed position, the cam surfaces abut against the respective cam followers at valley portions of the cam surfaces. Exertion of a rotating moment to rotate the keypad cover from the open position to the closed position or vice versa must be great enough to overcome the resistive forces exerted upon the respective cam pins against the cam surfaces of the respective hinge pins. Thus, the keypad cover 806 is urged to remain in either the open position or the closed position. Spring member 142 positioned between hinge pins 136 and 148 within hinge receiving chamber 130 generates translation forces upon the hinge pins 136 and 148. In the absence of rotating moments exerted upon keypad cover 806, such translation forces similarly urge rotation of the hinge pins, and, hence, the keypad cover, toward either an open position or a closed position such that the cam followers abut against valleys of the cam surfaces of the respective hinge pins.

The spacings between the valleys of the cam surfaces define the angled orientation of the keypad cover 806 relative to housing 812. Additionally, the slopes of the contours of the cam surfaces (i.e., the gradation, or steepness, of the sloped surfaces extending between valley and peak portions of the cam surfaces) are determinative of the amount of force required to form a rotating moment to cause rotation of keypad 806. Cam surface contours of steep slopes require greater amount of force to rotate the keypad cover from one position to another.

Because the hinge assembly of the present invention requires only a single tubular hinge arm of dimensions permitting positioning of a hinge pin therein, the physical dimensions required of such a hinge assembly are minimized. Additionally, because all of the elements of the hinge assembly may be assembled in a single, in-line operation, assembly of such hinge assembly is amenable to automation by an automated process.

While the present invention has been described in connection with the preferred embodiments shown in the various figures, it is to be understood that other similar embodiments may be used and modifications and additions may be made to the described embodiments for performing the some function of the present invention without deviating therefrom. Therefore, the present invention should not be limited to any single embodiment, but rather construed in breadth and scope in accordance with the recitation of the appended claims.

What is claimed is:

1. A telephone device having a hinge assembly for hingedly connecting a first substrate and a second substrate theretogether, thereby to permit positioning of the first substrate in a closed position whereat a face surface of the first substrate and a face surface of the second substrate abut against one another and in at least one open position whereat the first substrate extends beyond the substrate at an angled orientation relative thereto, said hinge assembly comprising:

a hinge arm coupled to at least the first substrate, the hinge arm forming a transversely-extending, hinge receiving chamber defined by inner sidewalls of the hinge arm;

at least one axially-extending hinge pin having a cylindrical body with an open cavity therein, a cam surface formed on an edge surface of the cylindrical body near the open cavity, the cam surface defining a continuous profile comprising first and second valley portions separated by a peak portion, wherein a first slope of the profile between the first valley portion and the peak portion is steeper than a second slope of the profile between the peak portion and the second valley portion, wherein the at least one axially-extending hinge pin has dimensions permitting insertion thereof through the hinge receiving chamber such that, when inserted therein, rotational moments exerted upon the first substrate to cause rotational movement thereof, cause corresponding rotational movement of the hinge pin;

at least one circularly-shaped bushing formed in the second substrate;

at least one axle concentrically disposed within the circularly-shaped bushing for placement inside of the open cavity in the cylindrical body of the hinge pin; and at least one cam follower disposed between a portion of the circularly-shaped bushing and the axle for engaging with the profile of the cam surface formed upon the edge surface of the at least one axially-extending hinge pin such that exertion of rotational moments upon the first substrate to cause rotation thereof in a first direction to position the first substrate in the closed position causes positioning, of the first valley portion of the cam surface of the hinge pin by operation of the first slope, in abutting engagement with the cam follower, and such that exertion of rotational moments upon the first substrate in an opposing direction to position the first substrate in the open position causes positioning, of the second valley portion of the cam surface of the hinge pin by operation of the second slope, in abutting engagement with the cam follower to urge the first substrate into the open position with a different force characteristic than the first substrate is urged into the closed position.

2. A hinge assembly for hingedly connecting a cover and a housing theretogether, thereby to permit positioning of the cover in a closed position whereat a face surface of the cover and a face surface of the housing abut against one another and in at least one open position whereat the cover extends beyond the housing at an angled orientation relative thereto, said hinge assembly comprising:

a hinge arm coupled to at least the cover, the hinge arm having inner sidewalls defining a transversely-extending, hinge receiving chamber;

at least one axially-extending hinge pin having a cylindrical body with an open cavity therein, a cam surface formed on an edge surface of the cylindrical body near the open cavity, the cam surface defining a continuous profile comprising first and second valley portions separated by a peak portion, wherein a first slope of the profile between the first valley portion and the peak portion is steeper than a second slope of the profile between the peak portion and the second valley portion, wherein the at least one axially-extending hinge pin has dimensions permitting insertion thereof through the hinge receiving chamber such that, when inserted therein, rotational moments exerted upon the cover to cause rotational movement thereof, cause corresponding rotational movement of the hinge pin;

at least one circularly-shaped bushing formed in the second substrate;

at least one axle concentrically disposed within the circularly-shaped bushing for placement inside of the open cavity in the cylindrical body of the hinge pin; and at least one cam follower disposed between a portion of the circularly-shaped bushing and the axle for engaging with the profile of the cam surface formed upon the edge surface of the at least one axially-extending hinge pin such that exertion of rotational moments upon the cover to cause rotation thereof in a first direction to position the cover in the closed position causes positioning, of the first valley portion of the cam surface of the hinge pin by operation of the first slope, in abutting engagement with the cam follower, and such that exertion of rotational moments upon the cover in an opposing direction to position the cover in the open position causes positioning, of the second valley portion of the cam surface of the hinge pin by operation of the second slope, in abutting engagement with the cam follower to urge the cover into the open position with a different force characteristic than the cover is urged into the closed position.

3. The hinge assembly of claim 2 wherein the hinge arm is integrally formed with the cover at an end portion thereof.

4. The hinge assembly of claim 2 wherein the at least one axially-extending hinge pin, once inserted into the hinge receiving chamber, is permitted translation therealong to position the cam surface of the hinge pin beyond the hinge receiving chamber of the hinge arm.

5. The hinge assembly of claim 2 wherein the inner sidewalls of the hinge arm defining the transversely extending hinge receiving chamber define the transversely extending hinge receiving chamber to be of a tubular configuration having a proximal side and a distal side.

6. The hinge assembly of claim 5 wherein the inner sidewalls of the hinge arm defining the transversely-extending hinge receiving chamber are slightly tapered such that a cross section of the hinge receiving chamber taken at a distal side thereof is of diametrical dimensions slightly less than diametrical dimensions taken of a cross section at a proximal side thereof.

7. The hinge assembly of claim 5 wherein the at least one axially-extending hinge pin comprises a first hinge pin and a second hinge pin, each of the first hinge pin and the second hinge pin having the continuous profile of the cam surface formed on the respective edge surfaces of the cylindrical body, wherein the profiles are mirror images of one another.

8. The hinge assembly of claim 7 wherein the at least one cam follower comprises a first cam follower and a second cam follower with the first cam follower being affixed to a distal side of the housing and the second cam follower being affixed to a proximal side of the housing.

9. The hinge assembly of claim 8 wherein the first hinge pin, once inserted into the hinge receiving chamber, is permitted translation through the hinge receiving chamber to position the cam surface of the first hinge pin beyond the distal side of the hinge receiving chamber, and the second hinge pin, once inserted into the hinge receiving chamber, is positioned such that the cam surface of the second hinge pin extends beyond the proximal side of the hinge-receiving chamber.

10. The hinge assembly of claim 9 further comprising a spring member of dimensions permitting insertion thereof into the hinge receiving chamber whereby positioning of the spring member in tandem between the first hinge pin and the second hinge pin and compressing the spring member causes translation forces to be exerted upon both the first hinge pin and the second hinge pin to urge the first hinge pin toward the first cam follower and to urge the second hinge pin toward the second cam follower.

11. The hinge assembly of claim 9 wherein, when the first and second hinge pins are inserted into the hinge receiving chamber, the first and second hinge pins are positioned in a relative, out-of-phase relation such that the cam surfaces formed on the edge surfaces of the first and second hinge pins are rotated axially with respect to one another.

12. The hinge assembly of claim 2 further comprising means for transmitting rotational moments exerted upon the housing to the at least one axially-extending hinge pin such that rotational movement of the housing responsive to exertion of the rotational moment thereupon causes corresponding movement of the at least one axially-extending hinge pin.

13. The hinge assembly of claim 12 wherein said means for transmitting rotational moments comprises at least one key member formed to extend axially along at least a portion of a surface of the at least one axially-extending hinge pin, and at least one axially-extending slot formed to extend axially along an inner sidewall of the hinge arm which defines the hinge receiving chamber, said axially-extending slot permitting mated engagement with the key member.

14. The hinge assembly of claim 2 further comprising means for exerting translation forces upon the at least one hinge pin for maintaining the cam surface of the hinge pin in position beyond the hinge receiving chamber of the hinge arm and in supportive engagement at the means for receiving formed upon the housing.

15. A telephone device having a hinge assembly for hingedly connecting a keypad cover to a radiotelephone housing having a radiotelephone keypad disposed upon a face surface of the radiotelephone housing, thereby to permit positioning of the cover in a closed position whereat the keypad cover covers the radiotelephone keypad and in an open position whereat the keypad cover extends beyond the radiotelephone housing at an angled orientation relative thereto, said hinge assembly comprising:

a hinge arm coupled to at least the cover, the hinge arm having inner sidewalls defining a transversely-extending, hinge receiving chamber, at least one axially-extending hinge pin having a cylindrical body with an open cavity therein, a cam surface formed on an edge surface of the cylindrical body near the open cavity, the cam surface defining a continuous profile comprising first and second valley portions separated by a peak portion, wherein a first slope of the profile between the first valley portion and the peak portion is steeper than a second slope of the profile between the peak portion and the second valley portion, wherein the at least one axially-extending hinge pin has dimensions permitting insertion thereof through the hinge receiving chamber such that, when inserted therein, rotational moments exerted upon the cover to cause rotational movement thereof, cause corresponding rotational movement of the hinge pin;

at least one circularly-shaped bushing formed in the second substrate;

at least one axle concentrically disposed within the circularly-shaped bushing for placement inside of the open cavity in the cylindrical body of the hinge pin; and at least one cam follower disposed between a portion of the circularly-shaped bushing and the axle for engaging with the profile of the cam surface formed upon the edge surface of the at least one axially-extending hinge pin such that exertion of rotational moments upon the cover to cause rotation thereof in a first direction to position the cover in the closed position causes positioning, of the first valley portion of the cam surface of the hinge pin by operation of the first slope, in abutting engagement with the cam follower, and such that exertion of rotational moments upon the cover in an opposing direction to position the cover in the open position causes positioning, of the second valley portion of the cam surface of the hinge pin by operation of the second slope, in abutting engagement with the cam follower to urge the cover into the open position with a different force characteristic than the cover is urged into the closed position.

16. In a radio transceiver having transceiver circuitry housed within a transceiver housing, a keypad disposed upon a face surface of the transceiver housing, and a keypad cover for covering the keypad, the combination with the transceiver housing and the keypad cover of a hinge assembly for hingedly connecting the keypad cover and the housing together, thereby to permit positioning of the keypad cover in a closed position whereat the keypad cover extends beyond the radiotelephone housing at an angled orientation relative thereto, said housing assembly comprising:

- a hinge arm coupled to at least the cover, the hinge arm having inner sidewalls defining a transversely-extending, hinge receiving chamber;
- at least one axially-extending hinge pin having a cylindrical body with an open cavity therein, a cam surface formed on an edge surface of the cylindrical body near the open cavity, the cam surface defining a continuous profile comprising first and second valley portions separated by a peak portion, wherein a first slope of the profile between the first valley portion and the peak portion is steeper than a second slope of the profile between the peak portion and the second valley portion, wherein the at least one axially-extending hinge pin has dimensions permitting insertion thereof through the hinge receiving chamber such that, when inserted therein, rotational moments exerted upon the cover to cause rotational movement thereof, cause corresponding rotational movement of the hinge pin;
- at least one circularly-shaped bushing formed in the second substrate;
- at least one axle concentrically disposed within the circularly-shaped bushing for placement inside of the open cavity in the cylindrical body of the hinge pin; and
- at least one cam follower disposed between a portion of the circularly-shaped bushing and the axle for engaging with the profile of the cam surface formed upon the edge surface of the at least one axially-extending hinge pin such that exertion of rotational moments upon the cover to cause rotation thereof in a first direction to position the cover in the closed position causes positioning, of the first valley portion of the cam surface of the hinge pin by operation of the first slope, in abutting engagement with the cam follower, and such that exertion of rotational moments upon the cover in an opposing direction to position the cover in the open position causes positioning, of the second valley portion of the cam surface of the hinge pin by operation of the second slope, in abutting engagement with the cam follower to urge the cover into the open position with a different force characteristic than the cover is urged into the closed position.

17. A portable electronic device having a hinge assembly for hingedly connecting a first substrate and a second substrate theretogether, thereby to permit positioning of the first and second substrates in a closed position whereat a face surface of the first substrate and a face surface of the second substrate abut against one another and in at least one open position whereat the first and second substrates extend beyond one another at an angled orientation relative thereto, said hinge assembly comprising:

- a hinge arm coupled to at least the first substrate, the hinge arm forming an axially-extending, hinge receiving chamber defined by inner sidewalls of the hinge arm;
- at least one axially-extending hinge pin having a cylindrical body with an open cavity therein, a cam surface formed on an edge surface of the cylindrical body near the open cavity, the cam surface defining a continuous profile comprising first and second valley portions and at least one peak portion, wherein a first slope of the profile between the first valley portion and the peak portion is steeper than a second slope of the profile between the peak portion and the second valley portion, wherein the at least one axially-extending hinge pin has dimensions permitting insertion thereof through the hinge receiving chamber such that, when inserted therein, rotational moments exerted upon the substrates to cause rotational movement thereof, cause corresponding rotational movement of the hinge pin;
- at least one circularly-shaped bushing formed in the second substrate;
- at least one axle concentrically disposed within the circularly-shaped bushing for placement inside of the open cavity in the cylindrical body of the hinge pin; and
- at least one cam follower disposed between a portion of the circularly-shaped bushing and the axle for engaging with the profile of the cam surface formed upon the edge surface of the at least one axially-extending hinge pin such that exertion of rotational moments upon the substrates to cause rotation in a first direction to position the first and second substrates in the closed position causes positioning, of the first valley portion of the cam surface of the hinge pin by operation of the first slope, in abutting engagement with the cam follower, and such that exertion of rotational moments upon the substrates in an opposing direction to position the substrates in the open position causes positioning, of the second valley portion of the cam surface of the hinge pin by operation of the second slope, in abutting engagement with the cam follower to urge the first and second substrates in the open position with a different force characteristic than in the closed position.

* * * * *